(12) United States Patent
Kanegae et al.

(10) Patent No.: US 11,536,413 B2
(45) Date of Patent: Dec. 27, 2022

(54) CONNECTOR

(71) Applicant: Sumitomo Riko Company Limited, Aichi (JP)

(72) Inventors: Ryousuke Kanegae, Aichi (JP); Ryuji Shibata, Aichi (JP); Yorihiro Takimoto, Aichi (JP); Yoshiki Kodaka, Aichi (JP); Ryoya Kawai, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/341,388

(22) Filed: Jun. 8, 2021

(65) Prior Publication Data
US 2021/0293363 A1   Sep. 23, 2021

Related U.S. Application Data

(63) Continuation of application No. PCT/JP2020/008785, filed on Mar. 3, 2020.

(30) Foreign Application Priority Data

Mar. 15, 2019 (JP) .............................. JP2019-048227

(51) Int. Cl.
*F02M 37/00* (2006.01)
*F16L 29/00* (2006.01)
*F16L 55/055* (2006.01)

(52) U.S. Cl.
CPC ....... *F16L 55/055* (2013.01); *F02M 37/0017* (2013.01); *F16L 29/00* (2013.01)

(58) Field of Classification Search
CPC ........... F02M 37/0017; F02M 37/0023; F02M 55/004; F02M 59/46; F02M 59/464;
(Continued)

(56) References Cited

U.S. PATENT DOCUMENTS 4,345,593 A * 8/1982 Sullivan ................... A62B 7/04
                                                                 128/205.24
5,209,259 A * 5/1993 Dear ..................... F16L 55/033
                                                                  137/561 A
(Continued)

FOREIGN PATENT DOCUMENTS

AU         629228 B2  * 10/1992
GB        2202595 A   *  9/1988   ........... F02M 59/462
(Continued)

OTHER PUBLICATIONS

"International Search Report (Form PCT/ISA/210) of PCT/JP2020/008785," dated Jun. 9, 2020, with English translation thereof, pp. 1-4.
(Continued)

*Primary Examiner* — Hailey K. Do
(74) *Attorney, Agent, or Firm* — JCIPRNET (57) ABSTRACT

A connector that is in a fuel supply system capable of supplying a high-pressure fuel, and may reduce pulsation in a low-pressure pipe with a simple structure and extend the life of a mold is provided. A valve of the connector includes a valve seat contact surface and a tapering through hole. The valve seat contact surface axially separates from an annular valve seat and forms a forward-direction flow path due to pressure of the low-pressure fuel when the high-pressure fuel does not flow in reverse, and may come into contact with the annular valve seat when the high-pressure fuel flows in reverse. The tapering through hole is formed farther radially inward than the valve seat contact surface, forms an orifice flow path having a smaller cross-sectional area than the forward-direction flow path, and allows a reverse flow of the high-pressure fuel when the high-pressure fuel flows in reverse.

7 Claims, 3 Drawing Sheets

(58) Field of Classification Search
CPC ...... F02M 37/0029; F16L 29/00; F16L 37/38; F16L 55/027; F16L 55/055; F16K 47/04; F16K 2200/40; F16K 2200/401; F16K 2200/402; F16K 47/10; F16K 17/30
See application file for complete search history.

(56) References Cited

U.S. PATENT DOCUMENTS

| | | | |
|---|---|---|---|
| 6,305,356 B1 * | 10/2001 | Faix | F04B 53/18 |
| | | | 123/495 |
| 7,124,738 B2 | 10/2006 | Usui et al. | |
| 7,401,594 B2 | 7/2008 | Usui et al. | |
| 11,092,123 B2 * | 8/2021 | Kanegae | F02M 55/00 |
| 2006/0185738 A1 * | 8/2006 | Nishiyama | F16L 37/40 |
| | | | 137/543.23 |
| 2006/0260705 A1 * | 11/2006 | Baltes | F15B 1/22 |
| | | | 138/45 |
| 2018/0038320 A1 * | 2/2018 | Waples | F02M 25/0872 |

FOREIGN PATENT DOCUMENTS

| | | |
|---|---|---|
| JP | 2000265926 | 9/2000 |
| JP | 2007218264 | 8/2007 |

OTHER PUBLICATIONS

"Office Action of China Counterpart Application", dated May 7, 2022, with English translation thereof, p. 1-p. 16.

* cited by examiner

CONNECTOR

CROSS-REFERENCE TO RELATED APPLICATION

The present application is a continuation of PCT/JP2020/008785, filed on Mar. 3, 2020, and is related to and claims priority from Japanese patent application no. 2019-048227, filed on Mar. 15, 2019. The entire contents of the aforementioned application are hereby incorporated by reference herein.

BACKGROUND

Technical Field

The disclosure relates to a connector.

Description of Related Art

As described in Japanese Laid-open Publication No. 2007-218264 and Japanese Laid-open Publication No. 2000-265926, there is a fuel supply system that uses a high-pressure pump to pressurize low-pressure fuel supplied from a fuel tank by a low-pressure pump, and supplies pressurized high-pressure fuel to an internal combustion engine. In the fuel supply system, since pulsation occurs in a low-pressure pipe through which the low-pressure fuel flows due to the drive of the high-pressure pump, the pulsation should be reduced. In particular, when the high-pressure fuel pressurized by the high-pressure pump flows in reverse to the low-pressure pipe side, the pulsation in the low-pressure pipe should be reduced.

In Japanese Laid-open Publication No. 2007-218264, a damper mechanism is arranged to reduce the pulsation in the low-pressure pipe. In Japanese Laid-open Publication No. 2000-265926, a return passage that returns a part of the fuel from the high-pressure pump to the low-pressure pipe side is arranged to reduce the pulsation in the low-pressure pipe, and an electromagnetic valve and an orifice for opening the return passage are arranged.

SUMMARY

Technical Problem

However, the arrangement of the damper mechanism and the return passage complicates the structure and leads to high cost. In addition, manufacturing costs should be reduced. For example, when molding a valve by using a manufacturing method such as die casting and injection molding that supplies a molten material into a mold, the life of the mold should be extended. Therefore, the shape of the valve should be designed such that the life of the mold may be extended.

The disclosure provides a connector that is in a fuel supply system capable of supplying high-pressure fuel, and may reduce pulsation in a low-pressure pipe with a simple structure and extend the life of a mold.

Solution to the Problem

The connector according to the disclosure is a connector in a fuel supply system that pressurizes low-pressure fuel supplied from a low-pressure pump by a high-pressure pump and supplies high-pressure fuel to an internal combustion engine, and is connected to a low-pressure pipe through which the low-pressure fuel flows. The connector is formed in a cylindrical shape, and includes a connector body that has an annular valve seat on an inner circumferential surface, and a valve that is housed inside the connector body and is disposed reciprocally movable in a flow path direction of the connector body.

The valve has a valve seat contact surface and a tapering through hole. The valve seat contact surface is formed on an outer circumferential surface, and axially separates from the annular valve seat of the connector body and forms a forward-direction flow path with the annular valve seat of the connector body due to the pressure of the low-pressure fuel when the high-pressure fuel does not flow in reverse, and is capable of coming into contact with the annular valve seat of the connector body when the high-pressure fuel flows in reverse. The tapering through hole is formed farther radially inward than the valve seat contact surface, and forms an orifice flow path having a smaller flow path cross-sectional area than the forward-direction flow path, and allows a reverse flow of the high-pressure fuel when the high-pressure fuel flows in reverse.

In a steady state where the high-pressure fuel does not flow in reverse, the valve moves to the high-pressure pump side due to the pressure of the low-pressure fuel. As a result, the valve seat contact surface of the valve is separated from the annular valve seat of the connector body. In addition, the forward-direction flow path is formed between the annular valve seat of the connector body and the valve seat contact surface. Therefore, the low-pressure fuel is supplied to the high-pressure pump side by flowing through the forward-direction flow path.

On the other hand, when the high-pressure fuel flows in reverse, the valve moves to the low-pressure pump side due to the pressure of the high-pressure fuel. As a result, the valve seat contact surface of the valve is in contact with the annular valve seat of the connector body. However, the tapering through hole for forming an orifice flow path is formed in the valve. Therefore, the high-pressure fuel slightly flows to the low-pressure pump side via the tapering through hole. The pulsation in the low-pressure pipe closer to the low-pressure pump side than the connector reduces due to an effect of the orifice flow path of the tapering through hole.

Furthermore, the valve is configured to be housed in the connector. Here, the valve may be disposed in the low-pressure pipe instead of being housed in the connector. However, arranging the valve in the low-pressure pipe is not easy as compared with arranging the valve in the connector body. As a result, arranging the valve in the low-pressure pipe is not easy in terms of design and manufacture, and leads to high cost. Therefore, by arranging the valve in the connector body, the valve may be easily designed and manufactured, and may surely exert a pulsation reduction effect.

Furthermore, the tapering through hole as the orifice flow path is formed in the valve. In order to form the through hole in the valve, a protrusion reproducing the through hole should be provided on a mold. However, when the through hole has a small diameter, the protrusion of the mold also has a small diameter, and the durability of the protrusion of the mold becomes an issue.

Hence, the through hole as the orifice flow path is formed in a tapering shape. The protrusion of the mold for forming the tapering through hole also has a tapering shape. Therefore, the mold may be designed having a large-diameter side of the tapering protrusion as a base end side, and a small-diameter side of the tapering protrusion as a tip end side.

Compared with a case where the protrusion of the mold is formed having a same diameter throughout the entire length, by forming the protrusion in a tapering shape, the durability of the protrusion improves. That is, the life of the mold may be extended by forming the tapering through hole of the valve in a tapering shape.

DESCRIPTION OF THE EMBODIMENTS (1. Configuration of Fuel Supply System 1)

Figure 1:
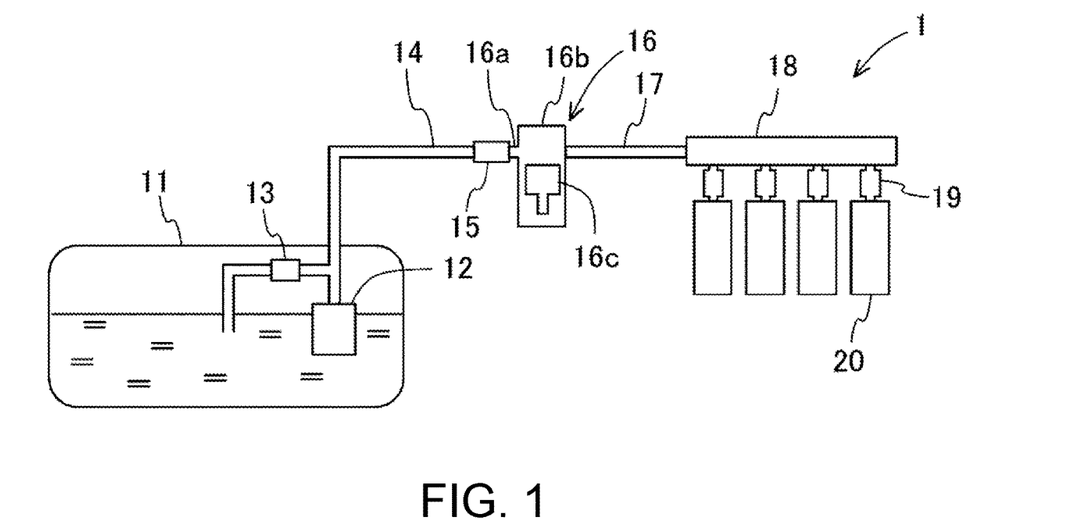
FIG. 1 is a schematic view of a fuel supply system.

The configuration of a fuel supply system 1 is described with reference to FIG. 1. As shown in FIG. 1, the fuel supply system 1 is a system supplying fuel from a fuel tank 11 to an internal combustion engine 20. In particular, in the fuel supply system 1, low-pressure fuel supplied from a low-pressure pump 12 is pressurized by a high-pressure pump 16, and pressurized high-pressure fuel is supplied to the internal combustion engine 20. The fuel supply system 1 includes the fuel tank 11, the low-pressure pump 12, a pressure regulator 13, a first low-pressure pipe 14, a connector 15, the high-pressure pump 16, a high-pressure pipe 17, a common rail 18, an injector 19, and the internal combustion engine 20.

The low-pressure pump 12 is disposed inside the fuel tank 11. A first end of the first low-pressure pipe 14 made of a resin is connected to an outlet side of the low-pressure pump 12. That is, the low-pressure pump 12 pumps the fuel stored in the fuel tank 11 to the first low-pressure pipe 14 side. The pressure regulator 13 is disposed in the fuel tank 11 and on the low-pressure pump 12 side of the first low-pressure pipe 14. The low-pressure fuel flowing through the first low-pressure pipe 14 is regulated to a constant pressure by the pressure regulator 13.

A second end (an opposite side to the low-pressure pump 12) of the first low-pressure pipe 14 is connected to a first end (a first cylindrical portion 31 described later) of the connector 15. A second end of the connector 15 (a second cylindrical portion 32 described later) is connected to a second low-pressure pipe 16a integrally arranged with the high-pressure pump 16. That is, the connector 15 connects the two low-pressure pipes (the first low-pressure pipe 14 and the second low-pressure pipe 16a) where the low-pressure fuel flows through. Specifically, the connector 15 connects the first low-pressure pipe 14 and the second low-pressure pipe 16a, and constitutes a flow path supplying the low-pressure fuel together with the first low-pressure pipe 14 and the second low-pressure pipe 16a.

The high-pressure pump 16 introduces the low-pressure fuel at the constant pressure supplied from the low-pressure pump 12 and the pressure regulator 13 via the first low-pressure pipe 14, the connector 15, and the second low-pressure pipe 16a. The high-pressure pump 16 pressurizes the introduced low-pressure fuel and discharges the pressurized high-pressure fuel.

The high-pressure pump 16, for example, includes the second low-pressure pipe 16a, a pump body 16b connected to the second low-pressure pipe 16a, and a plunger 16c arranged reciprocally movable in the pump body 16b. Therefore, the low-pressure fuel introduced into the pump body 16b is pressurized through a reciprocation of the plunger 16c. However, the high-pressure pump 16 is not limited to using the plunger 16c, and various configurations may be adopted as long as the fuel can be pressurized.

Furthermore, the high-pressure pump 16, for example, may be a mechanism linked to an operation of the internal combustion engine 20. In this case, during the operation of the internal combustion engine 20, the high-pressure pump 16 continuously operates regardless of whether the high-pressure fuel is discharged. For example, when the high-pressure pump 16 is configured to have the plunger 16c, there is a configuration in which the plunger 16c reciprocates by using a cam linked to a crankshaft constituting the internal combustion engine 20. In this case, the plunger 16c continues to reciprocate during an operation of the crankshaft.

The high-pressure fuel pressurized by the high-pressure pump 16 is supplied to the common rail 18 via the high-pressure pipe 17. The injector 19 corresponding to a number of cylinders of the internal combustion engine 20 is arranged on the common rail 18, and the injector 19 is mounted on the internal combustion engine 20. Therefore, the high-pressure fuel is injected to the internal combustion engine 20 via the common rail 18 and the injector 19.

(2. Operation of Fuel Supply System 1)

The operation of the fuel supply system 1 is described with reference to FIG. 1. When there is a need to supply the high-pressure fuel to the internal combustion engine 20, the low-pressure pump 12 and the high-pressure pump 16 operate. In other words, the low-pressure pump 12 operates so that the low-pressure fuel flows through the first low-pressure pipe 14, the connector 15, and the second low-pressure pipe 16a in a forward direction (a direction from the low-pressure pump 12 toward the high-pressure pump 16), and the low-pressure fuel is pressurized by the high-pressure pump 16. Moreover, the high-pressure fuel pressurized by the high-pressure pump 16 is supplied to the internal combustion engine 20 via the high-pressure pipe 17, the common rail 18, and the injector 19.

In addition, there may be no need to supply the high-pressure fuel to the internal combustion engine 20 during the operation of the internal combustion engine 20. In this case, the high-pressure fuel is not supplied from the injector 19 to the internal combustion engine 20. However, since the internal combustion engine 20 is in operation, the crankshaft constituting the internal combustion engine 20 continuously operates.

Moreover, the plunger 16c of the high-pressure pump 16 operates by using the cam linked to the crankshaft constituting the internal combustion engine 20. Therefore, even when there is no need to supply the high-pressure fuel to the internal combustion engine 20, the plunger 16c of the high-pressure pump 16 continuously operates during the operation of the crankshaft.

At this time, if the low-pressure pump 12 continuously operates, the low-pressure fuel is continuously supplied to the high-pressure pump 16 via the first low-pressure pipe 14, the connector 15, and the second low-pressure pipe 16a. The high-pressure pump 16 pressurizes the low-pressure fuel, but may not supply the pressurized high-pressure fuel to the internal combustion engine 20 side. Therefore, the high-pressure fuel pressurized by the high-pressure pump 16 may flow in reverse to the second low-pressure pipe 16a, the connector 15, and the first low-pressure pipe 14.

Due to a reverse flow of the high-pressure fuel, pulsation may occur in the first low-pressure pipe 14. If the first low-pressure pipe 14 vibrates due to the pulsation in the first low-pressure pipe 14, there is a risk that an abnormal noise or the like may occur. However, as described below, the connector 15 has a function of reducing the pulsation in the first low-pressure pipe 14. As a result, the pulsation in the first low-pressure pipe 14 is reduced, and the abnormal noise and the like are prevented from occurring.

(3. Configuration of Connector 15)

Figure 2:
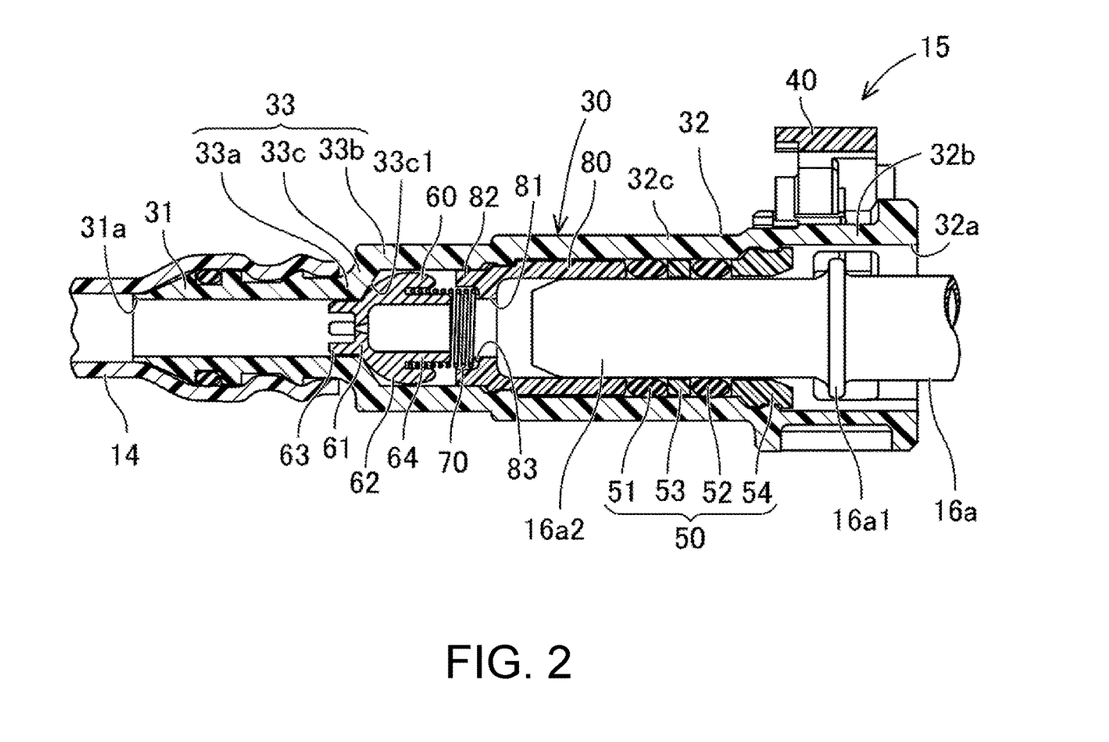
FIG. 2 is an axial cross-sectional view of a connector, showing a state in which a valve constituting the connector is in contact with an annular valve seat. The left side of the view is a first low-pressure pipe (low-pressure pump) side, and the right side of the view is a second low-pressure pipe (high-pressure pump) side. In the view, a retainer is located at an initial position.

The configuration of the connector 15 is described with reference to FIG. 2 and FIG. 3. As shown in FIG. 2, the connector 15 connects the first low-pressure pipe 14 and the second low-pressure pipe 16a, and circulates fuel between the first low-pressure pipe 14 and the second low-pressure pipe 16a. An end of the first low-pressure pipe 14 is fitted on the first end side of the connector 15, and an end of the second low-pressure pipe 16a is inserted in the second end side of the connector 15.

Here, the first low-pressure pipe 14, for example, is formed of a resin, and is formed in a thin-walled cylindrical shape. Therefore, the first low-pressure pipe 14 is formed more deformable in radial expansion as compared with the connector 15. Furthermore, the second low-pressure pipe 16a, for example, is formed of a metal or a hard resin, and is formed in a cylindrical shape. The end of the second low-pressure pipe 16a includes an annular flange 16a1 (also referred to as a bead) which is formed protruding radially outward at a position axially separated from a tip by a distance, and a tip portion 16a2 which is a small-diameter portion closer to the tip side than the annular flange 16a1.

The connector 15 is described with an example of a quick connector type in the following, but as long as pipes can be connected, the connector 15 is not limited to the quick connector type. Furthermore, the connector 15 is not limited to the configuration of the quick connector type illustrated below, and various quick connector types may be adopted.

The connector 15, for example, includes a connector body 30, a retainer 40, a seal unit 50, a valve 60, an urging member 70, and a fixation bush 80. The connector body 30 is formed in a cylindrical shape having a first opening 31a and a second opening 32a at two ends. In addition, the connector body 30 circulates fuel between the first opening 31a that is connected to the first low-pressure pipe 14 and the second opening 32a that is connected to the second low-pressure pipe 16a. In other words, the connector body 30 is a member for circulating fuel between the first opening 31a and the second opening 32a.

In the embodiment, the connector body 30 is formed in a linear cylindrical shape. However, the connector body 30 is not limited to the linear shape, and may be formed in a cylindrical shape having a bent portion (not shown), such as an L-shaped cylindrical shape. Furthermore, the connector body 30 is integrally molded out of a hard resin, and is constituted by a member. For example, the connector body 30 is integrally molded through injection molding. The connector body 30, for example, is made of a glass fiber reinforced polyamide. In addition, the connector body 30 may be formed by integrating a plurality of members.

When being classified by flow path direction, the connector body 30 includes the first cylindrical portion 31, the second cylindrical portion 32, and a third cylindrical portion 33. In the forward direction of a fluid, the first cylindrical portion 31, the third cylindrical portion 33, and the second cylindrical portion 32 are connected in this order.

The first cylindrical portion 31 is a portion connected to the first low-pressure pipe 14. The first cylindrical portion 31 is a portion including the first opening 31a, and is formed in a linear cylindrical shape. The first opening 31a is an opening on a side where the end of the first low-pressure pipe 14 is fitted. The first cylindrical portion 31 overlaps with the first low-pressure pipe 14 in the flow path direction when the end of the first low-pressure pipe 14 is mounted on an outer circumferential side of the first opening 31a side of the first cylindrical portion 31. That is, an outer circumferential surface of the first cylindrical portion 31 is radially opposite to an inner circumferential surface of the first low-pressure pipe 14 in the entire length.

An inner circumferential surface of the first cylindrical portion 31, for example, is formed in a cylindrical shape. Furthermore, the inner circumferential surface of the first cylindrical portion 31 constitutes a surface with which the fuel is in direct contact. In addition, the outer circumferential surface of the first cylindrical portion 31 is formed in an uneven shape in a cross section of the flow path direction, so that the first low-pressure pipe 14 does not come out when being fitted. Moreover, an annular seal member is disposed on the outer circumferential surface of the first cylindrical portion 31, so as to have a sealing function between the outer circumferential surface of the first cylindrical portion 31 and the inner circumferential surface of the first low-pressure pipe 14.

Here, the first cylindrical portion 31 is formed of a material less likely to deform than the first low-pressure pipe 14. Therefore, when the first low-pressure pipe 14 is fitted on the first cylindrical portion 31, the first cylindrical portion 31 hardly deforms, and the first low-pressure pipe 14 radially expands. That is, the first low-pressure pipe 14 deforms following the unevenness of the outer circumferential surface of the first cylindrical portion 31.

The second cylindrical portion 32 is a portion connected to the second low-pressure pipe 16a, and is a portion in which the retainer 40 and the seal unit 50 are disposed. The second cylindrical portion 32 is a portion including the second opening 32a, and is formed in a linear cylindrical shape. The second opening 32a is an opening on a side where the tip portion 16a2 and the annular flange 16a1 of the second low-pressure pipe 16a are inserted in. The second cylindrical portion 32 overlaps with the second low-pressure pipe 16a in the flow path direction when the second low-pressure pipe 16a is inserted in.

The second cylindrical portion 32 includes a retainer arrangement portion 32b on the second opening 32a side. The retainer arrangement portion 32b has a hole radially penetrating, and is a portion on which the retainer 40 is disposed. The retainer 40 is configured to be radially engageable. The retainer arrangement portion 32b is appropriately formed in different shapes according to a structure of the retainer 40. In the embodiment, the connector body 30 and the retainer 40 are separately formed, but a function of the retainer 40 may be configured to be integrally arranged with the connector body 30.

Taking the retainer arrangement portion 32b as a reference point, the second cylindrical portion 32 includes a seal portion 32c on an opposite side to the second opening 32a. An inner circumferential surface of the seal portion 32c, for example, is formed in a cylindrical shape. The seal unit 50 is disposed on the inner circumferential side of the seal portion 32c. Here, a diameter of the inner circumferential surface of the second cylindrical portion 32 is larger than a diameter of the inner circumferential surface of the first cylindrical portion 31. For example, the diameter of the inner circumferential surface of the second cylindrical portion 32 is determined in consideration of a thickness of the second low-pressure pipe 16a and a thickness of the seal unit 50 so that the diameter of the inner circumferential surface of the first cylindrical portion 31 and the diameter of the inner circumferential surface of the second low-pressure pipe 16a are equivalent.

The third cylindrical portion 33 is a portion in which the valve 60, the urging member 70, and the fixation bush 80 are disposed. The third cylindrical portion 33 connects an opposite side to the first opening 31a in the first cylindrical portion 31 and an opposite side to the second opening 32a in the second cylindrical portion 32 in the flow path direction. In a range of the third cylindrical portion 33, neither the first low-pressure pipe 14 nor the second low-pressure pipe 16a exists.

Furthermore, the third cylindrical portion 33 includes a small-diameter cylindrical portion 33a, a large-diameter cylindrical portion 33b, and a diameter expansion portion 33c. The small-diameter cylindrical portion 33a is coaxially connected to the first cylindrical portion 31. Therefore, the small-diameter cylindrical portion 33a is located on the first opening 31a side of the third cylindrical portion 33. A diameter of an inner circumferential surface of the small-diameter cylindrical portion 33a is equivalent to the diameter of the inner circumferential surface of the first cylindrical portion 31. Therefore, the small-diameter cylindrical portion 33a forms a small-diameter flow path in the third cylindrical portion 33.

The large-diameter cylindrical portion 33b is coaxially connected to the second cylindrical portion 32. Therefore, the large-diameter cylindrical portion 33b is located on the second opening 32a side of the third cylindrical portion 33. A diameter of an inner circumferential surface of the large-diameter cylindrical portion 33b is substantially equivalent to a diameter of an inner circumferential surface of a portion in which an ultimate tip (a portion having an opening of the tip portion 16a2) of the second low-pressure pipe 16a in the second cylindrical portion 32 is inserted. The large-diameter cylindrical portion 33b forms a large-diameter flow path in the third cylindrical portion 33. Furthermore, in the embodiment, the large-diameter cylindrical portion 33b and the small-diameter cylindrical portion 33a are coaxially located. Furthermore, the inner circumferential surface of the large-diameter cylindrical portion 33b has an annular groove and an annular protruding portion near the axial center or on the second cylindrical portion 32 side.

The diameter expansion portion 33c connects the small-diameter cylindrical portion 33a and the large-diameter cylindrical portion 33b. The diameter expansion portion 33c has an annular valve seat 33c1 on an inner circumferential surface. The annular valve seat 33c1 is formed in a tapering shape that connects the inner circumferential surface of the small-diameter cylindrical portion 33a and the inner circumferential surface of the large-diameter cylindrical portion 33b. The annular valve seat 33c1 radially expands from the inner circumferential surface of the small-diameter cylindrical portion 33a toward the inner circumferential surface of the large-diameter cylindrical portion 33b. The annular valve seat 33c1 is a portion that is in direct contact with the valve 60.

The retainer 40, for example, is made of a glass fiber reinforced polyamide. The retainer 40 is held on the retainer arrangement portion 32b of the connector body 30. The retainer 40 is a member for connecting the connector body 30 and the second low-pressure pipe 16a. In addition, the retainer 40 is not limited to a configuration described below, and various common configurations may be adopted.

The retainer 40 may move in a radial direction of the retainer arrangement portion 32b due to a pushing operation and a pulling operation of an operator. When the second low-pressure pipe 16a is inserted in a regular position of the second cylindrical portion 32, the retainer 40 may move from an initial position (a position shown in FIG. 2) shown in FIG. 2 to a confirmation position (a position moved toward the downside of FIG. 2 and a position shown in FIG. 5). Therefore, the operator may confirm that the second low-pressure pipe 16a is inserted in the normal position of the second cylindrical portion 32 when it is possible to push the retainer 40 in.

Moreover, when the retainer 40 is pushed into the confirmation position, the retainer 40 is engaged with the annular flange 16a1 of the second low-pressure pipe 16a in a direction of pulling out the pipe, and the retainer 40 retains the second low-pressure pipe 16a. That is, by pushing the retainer 40, the operator may confirm that the second low-pressure pipe 16a is inserted in the regular position of the second cylindrical portion 32, and the second low-pressure pipe 16a is retained by the retainer 40.

The seal unit 50 restricts the flow of fuel between the inner circumferential surface of the second cylindrical portion 32 of the connector body 30 and the outer circumferential surface of the second low-pressure pipe 16a. The seal unit 50, for example, is constituted by annular seal members 51 and 52 made of fluororubber, a collar 53 made of a resin and sandwiched axially between the annular seal members 51 and 52, and a bush 54 made of a resin and positioning the annular seal members 51 and 52 and the collar 53 on the seal portion 32c of the second cylindrical portion 32. The tip portion 16a2 of the second low-pressure pipe 16a is inserted on an inner circumferential side of the seal unit 50, and the annular flange 16a1 of the second low-pressure pipe 16a is located closer to the second opening 32a side than the seal unit 50.

The valve 60 functions to circulate the low-pressure fuel in the forward direction when the high-pressure fuel is in a normal state of not flowing in reverse, and to reduce the pulsation when the high-pressure fuel flows in reverse. The valve 60 is housed inside the third cylindrical portion 33 of the connector body 30, and is reciprocally movable in an axial direction of the third cylindrical portion 33. That is, the valve 60 is reciprocally movable in the flow path direction in the third cylindrical portion 33. The valve 60 is integrally formed of a metal or a hard resin.

The valve 60 includes a valve body 61, a large-diameter restricting portion 62, a small-diameter restricting portion 63, and a mounting portion 64. As shown in FIG. 2 to FIG. 4, the valve body 61 is formed in a plate shape or a bottomed cylindrical shape. In the embodiment, the valve body 61 is formed in a plate shape.

Figure 3:
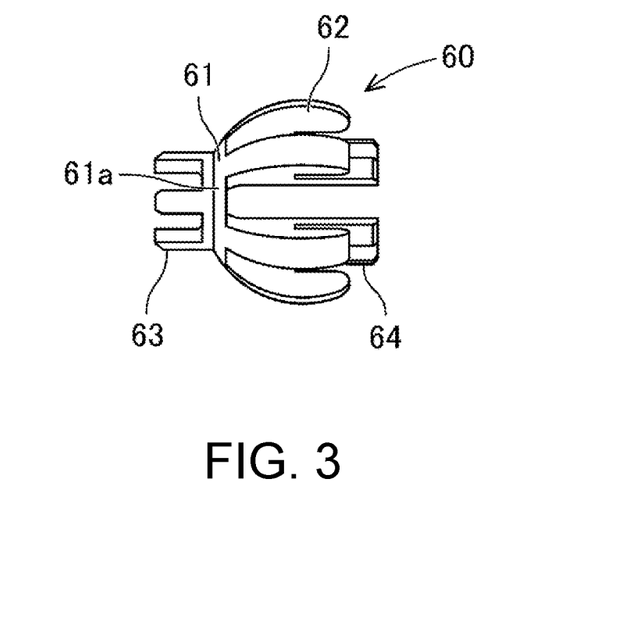
FIG. 3 is an enlarged front view of the valve constituting the connector of the first embodiment.
Figure 4:
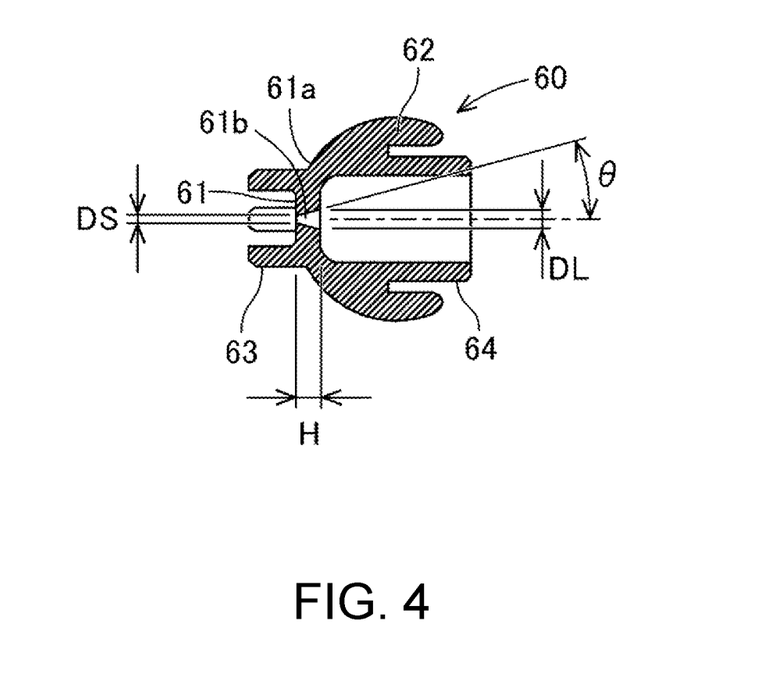
FIG. 4 is an axial cross-sectional view of the valve of FIG. 3.

As shown in FIG. 3 and FIG. 4, an outer circumferential surface of the valve body 61 includes a valve seat contact surface 61a. The valve seat contact surface 61a is formed in a partially spherical shape. The valve seat contact surface 61a may be in contact with the annular valve seat 33c1 of the third cylindrical portion 33 of the connector body 30. That is, the valve seat contact surface 61a is reciprocally movable between a contacting position and a separating position with respect to the annular valve seat 33c1.

When the valve seat contact surface 61a is in contact with the annular valve seat 33c1, fuel is restricted from flowing in a region between the valve seat contact surface 61a and the annular valve seat 33c1. On the other hand, when the valve seat contact surface 61a is separated from the annular valve seat 33c1, fuel may flow in the region between the valve seat contact surface 61a and the annular valve seat 33c1.

Here, the annular valve seat 33c1 of the third cylindrical portion 33 has a tapering shape, whereas the valve seat contact surface 61a of the valve body 61 has a partially spherical shape. Therefore, the annular valve seat 33c1 and the valve seat contact surface 61a is in linear contact. Furthermore, even if a posture of the valve body 61 slightly changes, the annular valve seat 33c1 and the valve seat contact surface 61a are surely in contact because the valve seat contact surface 61a is partially spherical.

The valve body 61 includes a tapering through hole 61b formed farther radially inward than the valve seat contact surface 61a. The tapering through hole 61b forms an orifice flow path. The tapering through hole 61b constantly circulates the flow of fuel between the first cylindrical portion 31 and the second cylindrical portion 32 in the connector body 30. Therefore, the tapering through hole 61b allows the low-pressure fuel to flow from the first cylindrical portion 31 to the second cylindrical portion 32 side in the forward direction, and allows the high-pressure fuel to flow from the second cylindrical portion 32 to the first cylindrical portion 31 side in the reverse direction.

Moreover, there may be one tapering through hole 61b or a plurality of tapering through holes 61b formed in the valve body 61. When one tapering through hole 61b is formed, the tapering through hole 61b, for example, is formed in the center of the valve body 61. In addition, the tapering through hole 61b has a small-diameter opening and a large-diameter opening because of being formed in a tapering shape. In the embodiment, the small-diameter opening of the tapering through hole 61b is disposed on the low-pressure pump 12 side, and the large-diameter opening is disposed on the high-pressure pump 16 side. However, the small-diameter opening may be disposed on the high-pressure pump 16 side, and the large-diameter opening may be disposed on the low-pressure pump 12 side.

The large-diameter restricting portion 62 is integrally formed on the valve body 61, and is formed extending from an outer circumferential edge of a surface of the valve body 61 on the second cylindrical portion 32 side toward the second cylindrical portion 32 side. As shown in FIG. 3, the large-diameter restricting portion 62 is formed in a plurality of claw-like shapes, and a gap where fuel may flow through is formed between the large-diameter restricting portions 62 that circumferentially adjoin each other. In the embodiment, there are 6 large-diameter restricting portions 62 shown as examples, but there may be any number of large-diameter restricting portions 62.

A radial outer surface of the large-diameter restricting portion 62 is formed in a partially spherical shape that is concentric with the valve seat contact surface 61a of the outer circumferential surface of the valve body 61. The radial outer surface of the large-diameter restricting portion 62 may be in contact with the inner circumferential surface of the large-diameter cylindrical portion 33b of the third cylindrical portion 33. As a result, the large-diameter restricting portion 62 exerts a function of restricting the posture of the valve 60 with respect to the third cylindrical portion 33. However, the valve 60 is disposed axially movable inside the third cylindrical portion 33. Therefore, the large-diameter restricting portion 62 is disposed to have a slight radial gap with respect to the large-diameter cylindrical portion 33b of the third cylindrical portion 33. Hence, the posture of the valve 60 may change but change slightly.

The small-diameter restricting portion 63 is integrally formed on the valve body 61, and is formed axially extending in parallel from a surface of the valve body 61 on the first cylindrical portion 31 side toward the first cylindrical portion 31. As shown in FIG. 3, the small-diameter restricting portion 63 is formed in a plurality of claw-like shapes, and a gap where fuel may flow through is formed between the small-diameter restricting portions 63 that circumferentially adjoin each other. In the embodiment, there are 4 small-diameter restricting portions 63 shown as examples, but there may be any number of small-diameter restricting portions 63.

A radial outer surface of the small-diameter restricting portion 63 may be in contact with the inner circumferential surface of the small-diameter cylindrical portion 33a of the third cylindrical portion 33. As a result, the small-diameter restricting portion 63 restricts the posture of the valve 60 with respect to the third cylindrical portion 33. However, the valve 60 is disposed axially movable inside the third cylindrical portion 33. Therefore, the small-diameter restricting portion 63 is disposed to have a slight radial gap with respect to the small-diameter cylindrical portion 33a of the third cylindrical portion 33. Hence, from this perspective, the posture of the valve 60 may also change but changes slightly.

The mounting portion 64 is formed axially extending in parallel from a radial inner surface of the large-diameter restricting portion 62 toward the second cylindrical portion 32 side. As shown in FIG. 3, the mounting portion 64 is formed in a plurality of claw-like shapes, and a gap where fuel may flow through is formed between the mounting portions 64 that circumferentially adjoin each other. In the embodiment, there are 6 mounting portions 64 shown as examples, which is the same as the number of large-diameter restricting portions 62, but there may be any number of mounting portions 64. Moreover, a radial outer surface of the mounting portion 64 is opposite to the radial inner surface of the large-diameter restricting portion 62 over a gap radially.

The urging member 70 is mounted on the radial outer surface side of the mounting portion 64, and urges the valve 60 toward the annular valve seat 33c1. A coil spring is given as an example of the urging member 70, but other springs may also be adopted. The urging member 70 may surely exert an urging force on the valve 60 in a direction toward the annular valve seat 33c1 because a posture of the urging member 70 is maintained. Furthermore, the urging force of the urging member 70 is set to be equal to or smaller than the pressure of the low-pressure fuel. Therefore, the urging member 70 is compressed when the pressure of the low-pressure fuel affects.

The fixation bush 80 is made of a metal or a hard resin, and is formed in a cylindrical shape having a through hole as shown in FIG. 2. The through hole of the fixation bush 80 functions as a flow path of fuel. An outer circumferential surface of the fixation bush 80 has an annular protruding portion and an annular groove corresponding to the annular groove and the annular protruding portion on the inner circumferential surface of the large-diameter cylindrical portion 33b. In addition, since the fixation bush 80 and the large-diameter cylindrical portion 33b are engaged, the fixation bush 80 is axially positioned with respect to the third cylindrical portion 33.

Moreover, the fixation bush 80 has an annular inner protrusion 81 protruding radially inward, an cylindrical end portion 82 extending from an outer circumferential side of the inner protrusion 81 to the valve 60 side, and an annular shaft protrusion 83 protruding from an inner circumferential side of the inner protrusion 81 to the valve 60 side and partially opposing the cylindrical end portion 82. The urging member 70 is disposed radially between the cylindrical end portion 82 and the shaft protrusion 83, and is supported by an end face of the inner protrusion 81. Therefore, the fixation bush 80 may surely allow the valve seat contact surface 61a of the valve 60 to be in contact with the annular valve seat 33c1 by restricting a moving range of the valve 60 and the urging member 70.

(4. Effect of Valve 60)

Figure 5:
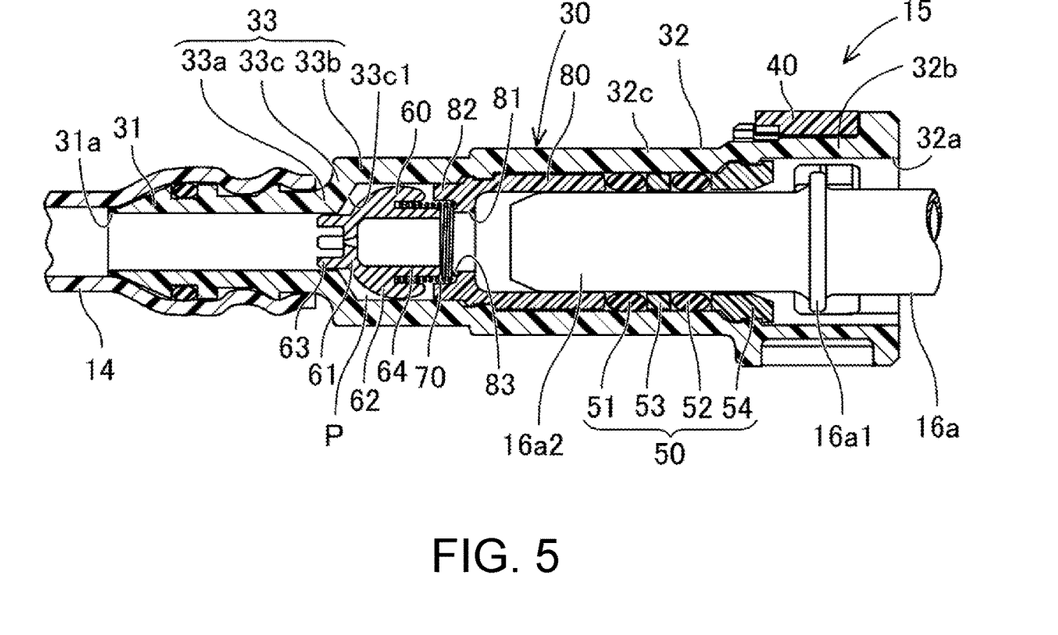
FIG. 5 is an axial cross-sectional view of a connector, showing a state in which a valve is separated from an annular valve seat. In the view, a retainer is located at a confirmation position.

The effect of the valve 60 is described with reference to FIG. 2 and FIG. 5. Here, FIG. 5 illustrates a case where the valve 60 is in a first state, and FIG. 2 illustrates a case where the valve 60 is in a second state.

The first state is that when the high-pressure fuel is in a steady state of not flowing in reverse, the valve seat contact surface 61a of the valve body 61 of the valve 60 axially separates from the annular valve seat 33c1 of the third cylindrical portion 33 of the connector body 30 due to the pressure of the low-pressure fuel, and a forward-direction flow path P (shown in FIG. 5) is formed between the valve seat contact surface 61a and the annular valve seat 33c1. The second state is that when the high-pressure fuel is in a state of flowing in reverse, the valve seat contact surface 61a of the valve 60 is in contact with the annular valve seat 33c1, and the forward-direction flow path P between the valve seat contact surface 61a and the annular valve seat 33c1 is closed.

First, during the steady state where the high-pressure fuel does not flow in reverse, the valve 60 is in the first state. The case of the first state is described with reference to FIG. 5. In the steady state where the high-pressure fuel does not flow in reverse, the low-pressure fuel regulated to the constant pressure by the low-pressure pump 12 and the pressure regulator 13 is supplied to the pump body 16b of the high-pressure pump 16 via the first low-pressure pipe 14, the connector 15, and the second low-pressure pipe 16a. At this time, in the connector 15, a flow direction of the low-pressure fuel is a direction (from left to right in FIG. 5) from the first cylindrical portion 31 of the connector body 30 toward the second cylindrical portion 32 of the connector body 30. Therefore, a force received by the valve 60 from the low-pressure fuel is in a direction resisting the urging force of the urging member 70.

Here, the urging force of the urging member 70 is set to be equal to or smaller than the pressure of the regulated low-pressure fuel. Therefore, when the pressure of the low-pressure fuel acts on the valve 60, the urging member 70 is compressed, and the valve 60 moves to the high-pressure pump 16 side. In that case, as shown in FIG. 5, the valve seat contact surface 61a of the valve body 61 of the valve 60 is in the first state, which is being separated from the annular valve seat 33c1 of the third cylindrical portion 33 of the connector body 30.

Therefore, the forward-direction flow path P is formed between the annular valve seat 33c1 and the valve seat contact surface 61a. The forward-direction flow path P is circumferentially formed on the entire circumference of the valve seat contact surface 61a. Furthermore, since a cross-sectional area of the forward-direction flow path P is set sufficiently large, there is hardly any decrease in the pressure of the low-pressure fuel in the forward-direction flow path P. Therefore, the low-pressure fuel is supplied to the pump body 16b of the high-pressure pump 16 at a state in which a required pressure state is maintained.

Here, the tapering through hole 61b constantly allows the flow of fuel. Therefore, the low-pressure fuel flows through the tapering through hole 61b in addition to the forward-direction flow path P. However, a flow path cross-sectional area in the small-diameter opening of the tapering through hole 61b is extremely small as compared with the flow path cross-sectional area of the forward-direction flow path P. Therefore, most of the low-pressure fuel flows through the forward-direction flow path P.

Next, when the high-pressure fuel flows in reverse, the valve 60 is in the second state. The case of the second state is described with reference to FIG. 2. There is high-pressure fuel in the second low-pressure pipe 16a when the high-pressure fuel flows in reverse. In addition, there is low-pressure fuel in the first low-pressure pipe 14. Fuel acting on two sides of the valve 60 has a pressure difference. As a result, the high-pressure fuel tends to flow from the second low-pressure pipe 16a to the first low-pressure pipe 14 side.

The valve 60 moves to the low-pressure pump 12 side due to the pressure of the high-pressure fuel. As a result, the valve 60 is pushed to the annular valve seat 33c1 side. Therefore, the valve seat contact surface 61a of the valve body 61 of the valve 60 is in the second state, which is being in contact with the annular valve seat 33c1. Hence, fuel is restricted from flowing between the valve seat contact surface 61a and the annular valve seat 33c1. However, the tapering through hole 61b constantly allowing the flow of fuel is formed in the valve body 61. That is, the high-pressure fuel slightly flows to the low-pressure pump 12 side via the tapering through hole 61b between the high-pressure pump 16 side and the low-pressure pump 12 side. In this way, the high-pressure fuel is allowed to flow in reverse only via the tapering through hole 61b.

Moreover, the tapering through hole 61b forms the orifice flow path that has the flow path cross-sectional area smaller than the flow path cross-sectional area of the forward-direction flow path P. Therefore, the high-pressure fuel in the second low-pressure pipe 16a flows to the first low-pressure pipe 14 via the tapering through hole 61b as the orifice flow path. As a result, through the effect of the orifice flow path of the tapering through hole 61b, it is possible to prevent pressure fluctuation of the high-pressure fuel generated in the pump body 16b of the high-pressure pump 16 from being directly transmitted to the first low-pressure pipe 14. That is, the pulsation in the first low-pressure pipe 14 may be reduced.

Furthermore, the valve 60 is configured to be built in the connector 15. Therefore, the valve 60 is easily disposed. In particular, the inner circumferential surface of the third cylindrical portion 33 of the connector body 30 is a surface that forms the forward-direction flow path P. Since the connector body 30 is easily formed, the forward-direction flow path P is also easily formed on the inner circumferential surface of the connector body 30. Therefore, the connector 15 housing the valve 60 is easily designed and manufactured.

In addition, the valve 60 may be disposed in the first low-pressure pipe 14 instead of being housed in the connector 15. However, arranging the valve 60 in the first low-pressure pipe 14 is not easy as compared with arranging the valve 60 in the connector body 30. As a result, arranging the valve 60 in the first low-pressure pipe 14 is not easy in terms of design and manufacture, and leads to high cost. Therefore, by arranging the valve 60 in the connector body 30, the valve 60 may be easily designed and manufactured, and may surely exert a pulsation reduction effect.

Furthermore, the valve seat contact surface 61*a* of the valve body 61 has a partially spherical shape. Therefore, when the valve 60 is in the second state, even if the posture of the valve 60 changes, the valve seat contact surface 61*a* is surely in contact with the annular valve seat 33*c*1. That is, in the second state, the annular valve seat 33*c*1 and the valve seat contact surface 61*a* may surely restrict the flow of high-pressure fluid. As a result, the tapering through hole 61*b* may surely exert the effect of the orifice flow path, and thus may surely exert the pulsation reduction effect.

(5. Details of Tapering Through Hole 61*b*)

The details of the tapering through hole 61*b* are described with reference to FIG. 4. The tapering through hole 61*b* has the small-diameter opening located on the low-pressure pump 12 side and the large-diameter opening located on the high-pressure pump 16 side. In the tapering through hole 61*b*, flow resistance of fuel is small in a direction from the large-diameter opening toward the small-diameter opening, and is large in a reverse direction. The small-diameter opening may be located on an inlet side of a portion where the flow resistance is intended to be increased.

In the embodiment, since the small-diameter opening is located on the low-pressure pump 12 side, the flow resistance from the low-pressure pump 12 side to the high-pressure pump 16 side is large. Therefore, in the first state in which the low-pressure fuel flows in the forward direction, the fuel flowing through the tapering through hole 61*b* is extremely little as compared with the forward-direction flow path P.

In addition, since the large-diameter opening is located on the high-pressure pump 16 side, flow resistance from the high-pressure pump 16 side to the low-pressure pump 12 side is small. Therefore, in the second state in which the high-pressure fuel flows in reverse, the tapering shape of the tapering through hole 61*b* functions to lead the high-pressure fuel to the tapering through hole 61*b*. That is, the high-pressure fuel may be led to the small-diameter opening having the minimum flow path cross-sectional area. As a result, the tapering through hole 61*b* as the orifice flow path may function more effectively.

Here, as shown in FIG. 4, an inner diameter DS of the small-diameter opening of the tapering through hole 61*b* is 0.1 mm to 2.0 mm, and preferably 0.1 mm to 1.0 mm. The small-diameter opening greatly influences the function as the orifice flow path. Therefore, the inner diameter of the small-diameter opening is set according to a degree of the function as the orifice flow path.

An inner diameter DL of the large-diameter opening of the tapering through hole 61*b* is greater than or equal to 1.0 mm, preferably greater than or equal to 2.0 mm, and more preferably greater than or equal to 3.0 mm. The large-diameter opening exerts a function of leading the high-pressure fuel to the tapering through hole 61*b*. Therefore, the inner diameter DL of the large-diameter opening is set according to a degree of the function of leading the high-pressure fuel, and is set according to the inner diameter DS of the small-diameter opening.

Furthermore, a taper angle $\theta$ of the tapering through hole 61*b* is 5 degrees to 45 degrees, and preferably 10 degrees to 30 degrees. The taper angle $\theta$ is equivalent to an apex angle of a cone of the tapering through hole 61*b*. When the taper angle $\theta$ is less than 5 degrees, the life of a mold 120 (shown in FIG. 6) described later decreases. When the taper angle $\theta$ is greater than 45 degrees, the durability of the valve body 61 decreases because there is a thin portion in the valve body 61.

Furthermore, in the tapering through hole 61*b*, an axial distance H between the small-diameter opening and the large-diameter opening is 1.0 mm to 4.0 mm. When the axial distance H is less than 1.0 mm, the durability of the valve body 61 decreases. When the axial distance H is greater than 4.0 mm, the life of the mold 120 described later decreases.

(6. Molds 110 and 120)

Figure 6:
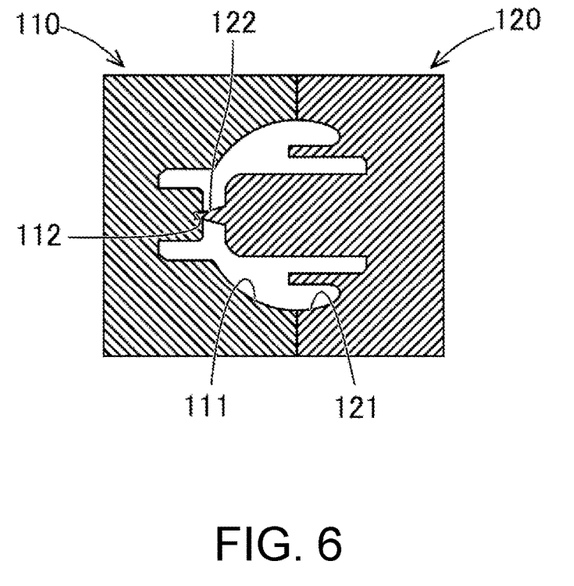
FIG. 6 is an axial cross-sectional view of a mold for molding a valve.

The molds 110 and 120 for molding the valve 60 are described with reference to FIG. 6. The valve 60 is formed in the first mold 110 and the second mold 120. That is, the valve 60 is formed by supplying a molten material, such as a molten resin, into cavities of the molds 110 and 120.

The first mold 110 has a first cavity surface 111 corresponding to the small-diameter restricting portion 63 side, and the second mold 120 has a second cavity surface 121 corresponding to the mounting portion 64 side. Moreover, the second mold 120 has a protrusion 122 reproducing the tapering through hole 61*b*. A base end of the protrusion 122 corresponds to the large-diameter opening of the tapering through hole 61*b*, and a tip end of the protrusion 122 corresponds to the small-diameter opening of the tapering through hole 61*b*. In addition, the first mold 110 has a recess 112 for positioning the protrusion 122 by inserting the tip end of the protrusion 122 of the second mold 120.

Here, in order to form the tapering through hole 61*b* in the valve body 61, a portion reproducing the tapering through hole 61*b* should be provided on one of the molds 110 and 120. In the embodiment, the protrusion 122 is provided on the second mold 120. In addition, when the tapering through hole 61*b* has a small diameter, the protrusion 122 of the second mold 120 also has a small diameter, and the durability of the protrusion 122 of the second mold 120 becomes an issue.

However, the tapering through hole 61*b* as the orifice flow path is formed in a tapering shape. Therefore, the protrusion 122 of the second mold 120 for forming the tapering through hole 61*b* also has a tapering shape. In addition, the second mold 120 may be designed to have the large-diameter side of the tapering protrusion 122 as the base end side, and the small-diameter side of the tapering protrusion 122 as the tip end side.

Compared with a case where the protrusion 122 of the second mold 120 is formed having a same diameter throughout the entire length, by forming the protrusion 122 in a tapering shape, the rigidity of the protrusion 122 increases. In particular, even if a pressure of the molten material acts on the protrusion 122, the durability of the protrusion 122 improves because the protrusion 122 has the rigidity. That is, the life of the second mold 120 may be extended by forming the tapering through hole 61*b* of the valve 60 in a tapering shape.

Moreover, the small-diameter opening of the tapering through hole 61*b* is formed by the tip end side of the protrusion 122. Therefore, the inner diameter of the small-diameter opening may be extremely small. By forming the protrusion 122 in a tapering shape, the inner diameter DS of the small-diameter opening may achieve to be 0.1 mm to 2.0 mm, and preferably 0.1 mm to 1.0 mm.

Furthermore, the tip end of the protrusion 122 is supported when being inserted into the recess 112 of the first mold 110. Therefore, even if the pressure of the molten material acts on the tip end portion, which has the small diameter, of the protrusion 122, the durability of the protrusion 122 may be improved since the protrusion 122 is supported by the recess 112.

What is claimed is:

1. A connector being in a fuel supply system that pressurizes low-pressure fuel supplied from a low-pressure pump by a high-pressure pump and supplies high-pressure fuel to an internal combustion engine, and connected to a low-pressure pipe through which the low-pressure fuel flows, the connector comprising:
    a connector body formed in a cylindrical shape, and having an annular valve seat on an inner circumferential surface; and
    a valve housed inside the connector body, and disposed reciprocally movable in a flow path direction of the connector body,
    wherein the valve comprises:
        a valve seat contact surface formed on an outer circumferential surface, axially separating from the annular valve seat of the connector body and forming a forward-direction flow path with the annular valve seat of the connector body due to pressure of the low-pressure fuel when the high-pressure fuel does not flow in reverse, and being capable of coming into contact with the annular valve seat of the connector body when the high-pressure fuel flows in reverse; and
        a tapering through hole formed farther radially inward than the valve seat contact surface, forming an orifice flow path having a smaller flow path cross-sectional area than the forward-direction flow path, and allowing a reverse flow of the high-pressure fuel when the high-pressure fuel flows in reverse.

2. The connector according to claim 1, wherein the tapering through hole has a small-diameter opening that is located on a low-pressure pump side, and a large-diameter opening that is located on a high-pressure pump side.

3. The connector according to claim 1, wherein one tapering through hole is formed in a center of the valve.

4. The connector according to claim 1, wherein the small-diameter opening of the tapering through hole has an inner diameter that is 0.1 mm to 2.0 mm.

5. The connector according to claim 4, wherein the inner diameter of the small-diameter opening of the tapering through hole is 0.1 mm to 1.0 mm.

6. The connector according to claim 1, wherein the tapering through hole has a taper angle that is 5 degrees to 45 degrees.

7. The connector according to claim 1, wherein the tapering through hole has an axial distance of 1.0 mm to 4.0 mm between a small-diameter opening and a large-diameter opening.

* * * * *